INVENTORS
JEAN MAURICE
RAYMOND LE BRISE

BY *Irwin S. Thompson*
ATTORNEY

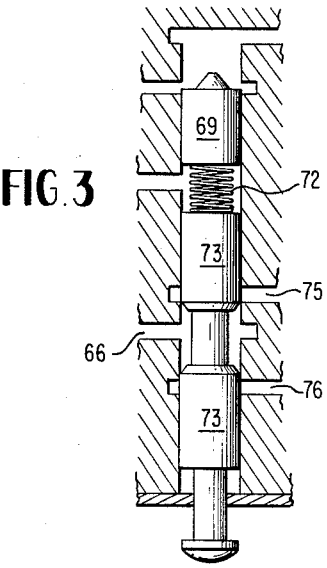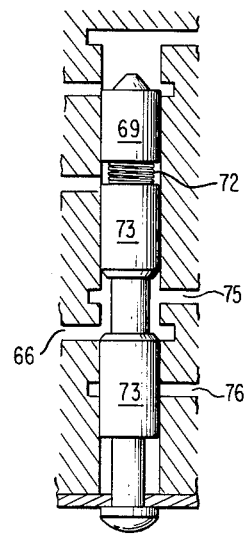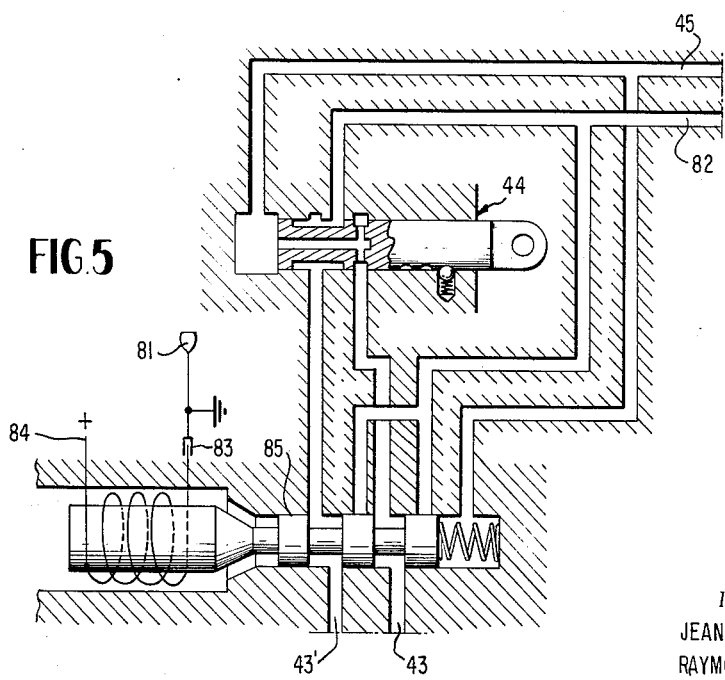
INVENTORS
JEAN MAURICE
RAYMOND LE BRISE
By Irwin S. Thompson
ATTORNEY 3,254,544
HYDROMECHANICAL TRANSMISSION
Jean Maurice, Paris, and Raymond Le Brise, Saint-Denis, France, assignors to Societe Anonyme Francaise du Ferodo, Paris, a French corporation
Filed Jan. 7, 1963, Ser. No. 249,924
Claims priority, application France, Jan. 9, 1962, 884,260
13 Claims. (Cl. 74—732)

The present invention relates to hydraulic transmissions comprising a torque converter or coupler, and particularly applicable to automobile vehicles.

In one of its aspects, the invention is more particularly directed to such transmissions which are followed by a device for reversing the direction of running, especially for vehicles of the handling truck type, and relates to transmissions of this kind comprising a torque converter which, in certain cases, handling trucks for example, need not necessitate any variable gear mechanism other than a reversing gear, or which are only followed by a ratio changing device, for example with two ratios, of very simple construction.

One of the objects of the present invention is a hydro-mechanical transmission of this kind which complies better than any system hitherto known with the various requirements of practice, and which in particular offers the following advantages: simplicity and small axial dimensions of the reversing system, without lever or dogs, or brake; simplicity of the hydraulic control which may comprise one or a number of supply-pressure levels; ease and smoothness of the reversing operation; convenient distribution of the engine power between the control of the movement and the control of the lifting devices; concentration of the mechanism in a very small space; reduced wear.

In accordance with the invention, a hydromechanical transmission between a driving shaft and a receiving shaft is especially characterized in that a bell filled with oil under pressure and rigidly fixed to the driving shaft, contains on the one hand a hydro-kinetic coupling apparatus (torque converter or coupler), the working circuit of which comprises at least one impeller rigidly fixed to the bell, and a turbine driven hydraulically by the impeller, and on the other hand, two clutches in which the clutch plates are fast for rotation with the said turbine and in which the friction discs are fast for rotation with two intermediate shafts respectively, while a system of gears compels the said intermediate shafts to rotate in opposite directions with a predetermined ratio of speed and is coupled to the said receiving shaft with the object of driving this latter, either in one direction or in the other, depending on which of the said clutches is engaged.

It should be noted that the arrangement of the clutches in the bell filled wtih oil which contains the hydro-kinetic coupling apparatus, not only permits a concentration of the actual construction but also ensures that the clutches work in an oil which can be adapted simultaneously and in a very satisfactory manner to the qualities of friction desired for the clutches and to the qualities of hydraulic drive for the hydro-kinetic coupling apparatus.

The clutches are preferably disposed in the interior of a cylindrical chamber having two end-plates coupled to the turbine; the end-plates of the chamber constitute the reaction plates, while the axially-movable pressure-plates which move from a central abutment, have the form of pistons sliding in a fluidtight manner on the cylindrical chamber and on the outer driven shaft. The chamber is in communication with the converter chamber by its central portion or so-called common chamber. The pistons are provided with one or a number of orifices which give a communication between the central portion of the chamber and the chambers defined between the bottom of the chamber and each of the pistons. These orifices provide a sufficient circulation of oil in the converter and at the same time cause a large pressure drop necessary to ensure engagement. The reaction and pressure-plates are provided with flat or slightly conical bearing surfaces, between which can be gripped the friction discs which are rigidly fixed to the two input shafts of the reversing gear.

In accordance with a preferred form of control, the individual chamber of each clutch is in communication, through the annular spaces which respectively separate the fixed sleeve coupled to the casing of the outer intermediate shaft and the two intermediate shafts with two conduit systems which, depending on the operation desired (forward running or reverse running) can respectively be either closed or put under pressure or caused to discharge.

In accordance with another characteristic feature, the hydro-kinetic coupling apparatus comprises a modulating means which acts on the said working circuit so as to modify its performance, and which is actuated at will between a position of full operation of the circuit and a position of reduced operation of the said circuit.

For this reason, the modulation is effected by the said working circuit rather than by the clutches, and the latter may have conditions of operation which are not severe, without giving rise to prolonged slip, so that these clutches may be of simple and light construction, and may comprise for example, friction discs having linings with a paper base.

The modulating means of the working circuit of the hydro-kinetic coupling apparatus preferably consists of an annular valve which engages in the impeller so as to close the working circuit at will. This enables the torque absorption of the converter impeller to be varied, that is to say the torque delivered by the turbine for a given speed of the impeller. This valve may be parallel to the axis of the converter (or coupler).

By virtue of this arrangement, the power of the engine can be divided between the lifting devices and the propulsion means of the truck. It is possible to run the engine at high speed in order to obtain rapid stacking, while obtaining a low and variable forward speed of the truck. It will be appreciated that this operation is obtained by hydraulic slip, and therefore without wear, which reduces dismantling work for overhaul.

The objects, characteristic features and advantages of the invention will furthermore become apparent from the description which follows below of forms of construction chosen by way of example, reference being made to the accompanying drawings, in which:

FIGS. 3 and 4 show one of the controls of this alternative form in two positions different from that in which this control is shown in FIG. 2;

FIG. 5 relates to still a further alternative form of construction.

Figure 1:
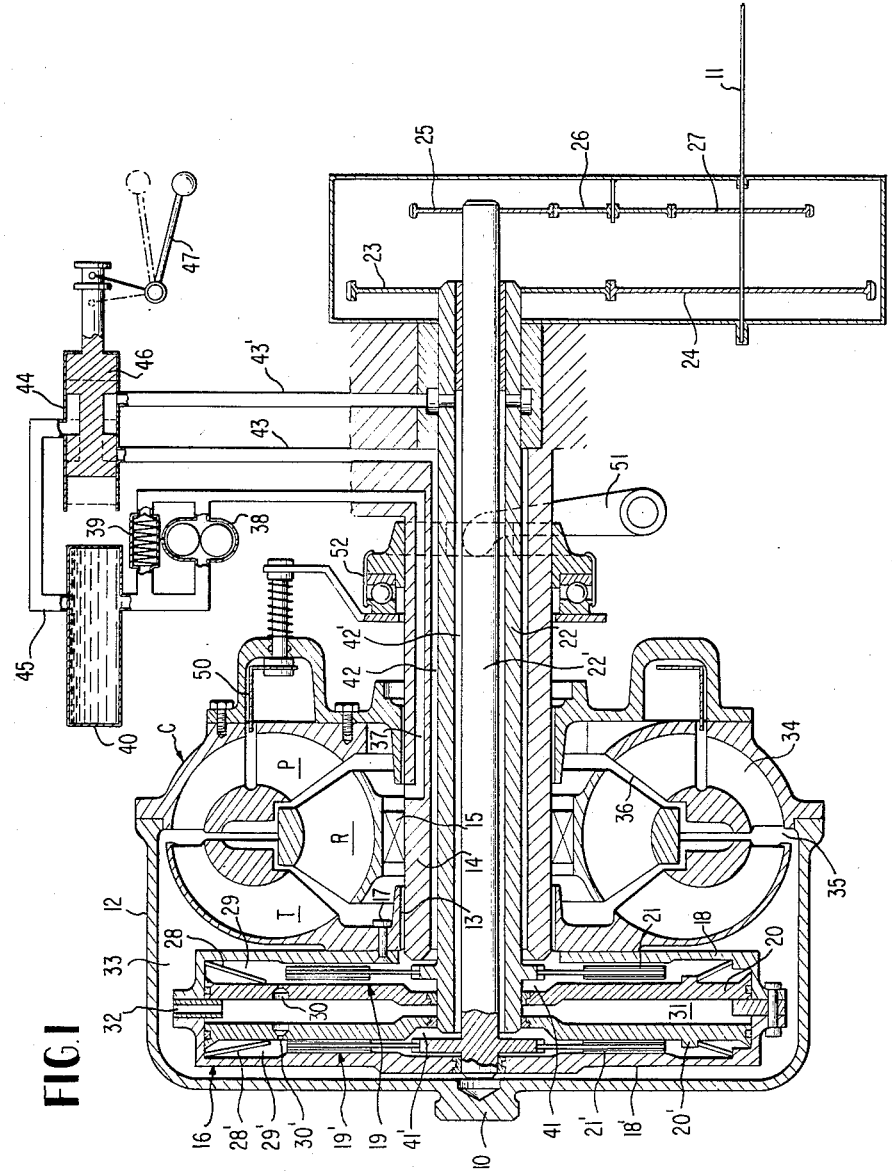
FIG. 1 is a diagrammatic view of a transmission according to the invention.

Reference will first be made to FIG. 1, which relates by way of example to an application of the invention to a transmission for a handling truck, of which the driving shaft is shown at 10 and the receiving shaft or output shaft at 11.

The driving shaft 10 is rigidly fixed to the bell 12 of a hydraulic coupling apparatus, constituted in the example shown by a hydraulic troque converter C, the impeler P of which is fixed to the bell 12 and the turbine T is rotatably mounted at 13 about a fixed sleeve 14, while the reactor R is coupled to the sleeve 14 through a free-wheel 15.

A drum 16 is disposed in the interior of the bell 12 and is bolted at 17 to the turbine T. The opposite flat walls 18 and 18' of the drum 16 form axial supporting plates for two clutches 19 and 19', each of which further comprises an axially-movable pressure plate 20 and 20' and a friction disc 21 and 21', intended to be gripped between the plates 18 and 20 and 18' and 20'. The disc 21 of the clutch 19 is coupled to a hollow intermediate shaft 22 which extends into the interior of the sleeve 14, while the disc 21' of the clutch 19' is coupled to another intermediate shaft 22' extending into the interior of the hollow shaft 22.

The shaft 22 carries a pinion 23 which engages with a pinion 24 rigidly fixed to the output shaft 11, while the shaft 22' carries a pinion 25 which engages with a reversing pinion 26 engaging in its turn with a pinion 27 fixed to the output shaft 11, so that when the said shaft 11 rotates, the shafts 22 and 22' rotate in opposite directions to each other.

The control of the clutches 19 and 19' is hydraulic, and is completed by Belleville washers 28 and 28', which tend to keep the clutches 19 and 19' disengaged. In the example shown, each washer 28 and 28' forms in addition a coupling means for the rotation of the pressure-plate 20 and 20' with the supporting plate 18 and 18' of the drum 16.

For the purposes of hydraulic control, each clutch 19 and 19' comprises a peripheral portion of a separate chamber 29 and 29' formed between the plates 18 and 20, 18' and 20' on the outer side of the disc 21 and 21'. The chamber 29 and 29' communicates through a calibrated orifice 30 and 30' with a common chamber 31, formed between the pressure-plates 20 and 20' and communicating in turn by large orifices 32 with the hydraulic chamber 33 of the bell 12.

The chamber 33 communicates with the working circuit 34 of the converter C through the space 35 comprised between the impeller P and the turbine T. The circuit 34 is connected through the space 36 comprised between the reactor R and the impeller P with a first conduit 37 which is supplied from a fluid-pressure means, constituted for example by a pump 38. This pump draws fluid from a tank 40 and is associated with a discharge-valve 39 acting as a pressure-limiting device in the conduit 37.

Each clutch 19 and 19' further comprises a central portion 41 and 41' of the separate chamber formed between the plates 18 and 20 and 18' and 20' on the inner side of the disc friction linings 21 and 21'. The chambers 41 and 41' communicate respectively through the spaces 42 and 42', the space 42 being included between the sleeves 14 and 22, while the other space 42' is comprised between the shafts 22 and 22', with a second and a third conduit 43 and 43'. The two conduits 43 and 43' are coupled to a distributor 44 which is connected by a fourth conduit 45 to the tank 40.

The slide-valve 46 of the distributor 44 is actuated by a lever 47 and is mounted so as to be movable between three positions: the forward running position (shown in chain-dotted lines in FIG. 1) in which the conduit 43' is closed by the slide-valve 46, while the conduit 43 communicates with the conduit 45 for discharge to the tank 40; a reverse-running position (shown in full lines in FIG. 1) in which the conduit 43' communicates with the conduit 45 while the conduit 43 is closed by the slide-valve 46; and a neutral or dead-center position, in which both the conduits 43 and 43' are closed by the slide-valve 46.

When the converter C is operative, it is constantly traversed by a flow of oil under pressure which returns to the tank 40 after passing through one or the other of the chambers 29 and 29' of the clutches 19 and 19'.

The clutch 19 or 19' is engaged when the conduit 43 or 43' communicates with the conduit 45, and it is disengaged when the conduit 43 or 43' is closed by the slide-valve 46. The engagement of the clutch 19 causes the shaft 11 to be driven by the shaft 22 and the pinions 23 and 24, which corresponds to forward running. The engagement of the clutch 19' causes the shaft 11 to be driven by the shaft 22' and the pinions 25, 26 and 27, which corresponds to reverse running.

In a more detailed manner, when the lever 47 is put into the reverse running position (shown in full lines in FIG. 1), the conduit 43' is connected to discharge while the conduit 43 is closed. In the clutch chamber 19' which is engaged, the pressure is nil in the vicinity of the shaft and when moving further from the axis it follows, to within a constant, a progression identical with the progression of the pressures in the chamber 31. The gripping action is therefore uniform along the operating piston 20', and is produced by a pressure in the vicinity of that delivered by the pump 38. In the chamber of the clutch 19 there is no circulation, the pressures are equal on both sides of the piston 20, on each side of the orifice 30, and the liquid in the chamber of the clutch 19 is practically immobilized between the center and the maximum radius of the disc 21, by reason of the opposite speeds of rotation of the plates 18 and 20 and of the disc 21 which are equal in the example shown, the forward and reverse gear ratios being identically the same. The pressure is thus constant inside the chamber of the clutch 19, which develops a force in the direction of disengagement. The operation is symmetrical with that described above in the case of forward running. The whole of the arrangement in accordance with the invention makes it possible to obtain, with a control operating at full-on or full-off, excellent progression in the operation of reversal of direction of running. The control of progression of clutch load during its period of engagement, together with the control of the application of pressure to the clutch chamber whose conduit 43 and 43' is closed, makes it possible to pass through a phase in which the two clutches 19 and 19' are partially engaged at the same time, which corresponds to the stopping of the vehicle. In order to regulate this overlap of the phases of engagement, it is possible to act on the characteristics of the chambers and of the supply conduits, on the conicity of the friction faces of the plates, on the elasticity of the friction discs, on the diameter of the orifices 30 and 30', etc.

In the example shown in FIG. 1, the working circuit 34 of the converter C can be closed at will by a valve in the form of a shutter 50, actuated from the exterior in order to vary the torque absorption of the impeller P of the converter C, that is to say the torque delivered by the turbine T for a pre-determined speed of the impeller P.

The shutter 50 has been shown parallel to the axis of the converter C and located slightly above its mean radius. The position of the shutter 50 with respect to the axis can vary between the two cylinders internally and externally tangent to the inner core of the impeller or of the turbine of the converter, and is preferably chosen in the vicinity of the periphery of the working circuit. With the shutter device 50, it is possible to divide the power of the engine between the lifting devices and the propulsion devices of the handling truck. It is thus possible to rotate the engine at high speed in order to obtain rapid stacking, while at the same time obtaining a low propulsion speed of the truck, this speed being variable. The operation of the shutter 50 is obtained by hydraulic slip and without wear.

The actuation of the shutter 50 shown in FIG. 1 is mechanical, and comprises a fork 51 and an abutment 52, similar to the fork and abutment of mechanical clutches. The operation of the shutter 50 may be made conjointly with the brake pedal which, during the first portion of its travel, actuates the shutter 50 and reduces the torque transmitted by the turbine T, and in the second part of its travel acts on the brakes of the vehicle.

Figure 2:
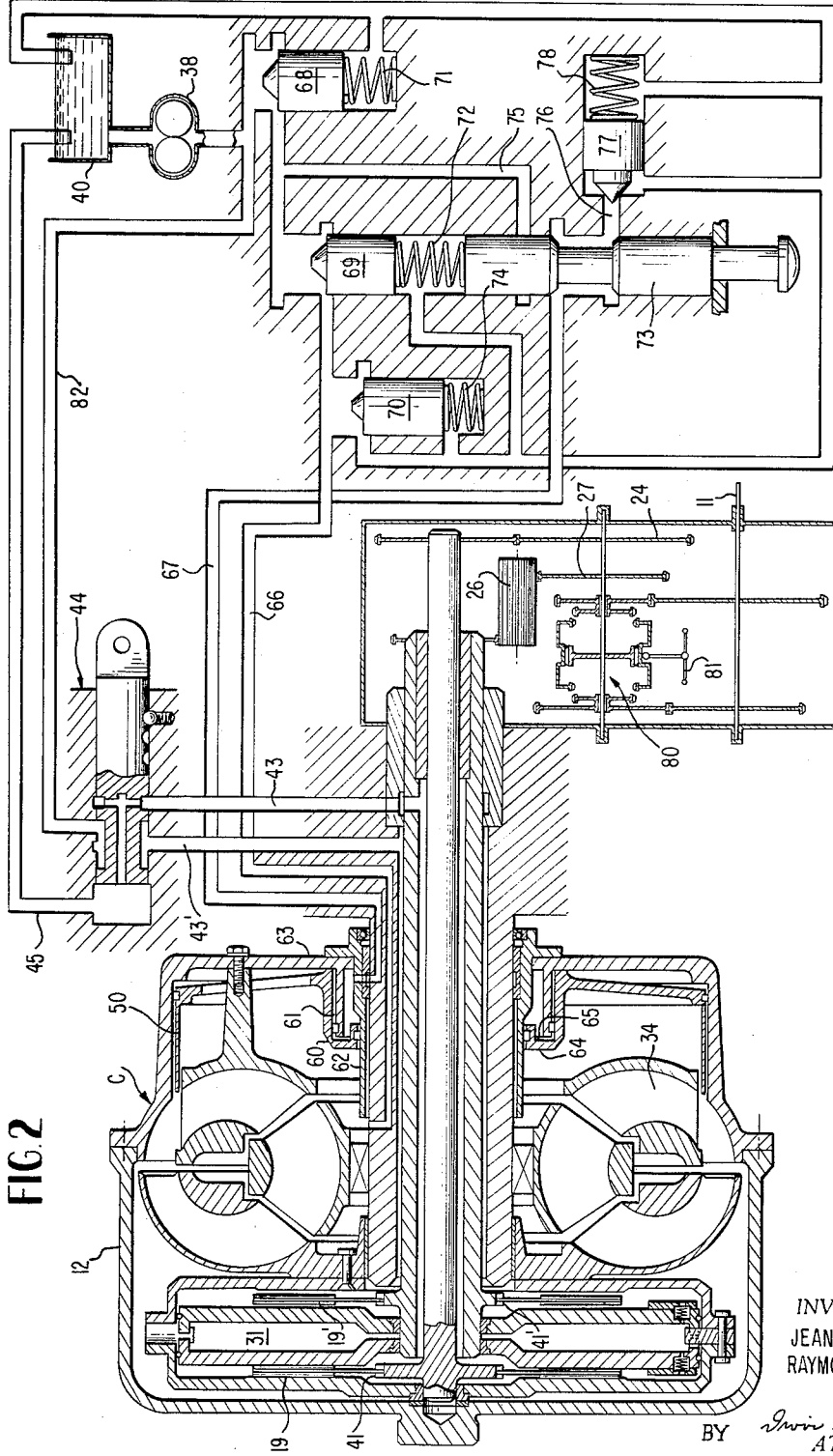
FIG. 2 is a similar view to FIG. 1, but relates to an alternative construction.

Reference will now be made to FIG. 2, in which the arrangement is similar to that which has been described above with reference to FIG. 1, but in which the controls of the shutter 50 and the clutches 19 and 19' are modified, and in which a gear-changing device with two speed ratios is provided between the pinions 24 and 27 and the shaft 11.

The shutter 50, which is in this case arranged at the periphery of the working circuit 34, is rigidly fixed to a piston 60 sliding on a double cylinder, the bearing surfaces 61 and 62 of which are formed on a casing 63 fixed to the bell 12. The piston 60 is subjected on its first face 64 to the pressure created in the working circuit 34 and derived from a conduit 66, and on its second face 65 to a variable control pressure derived from a conduit 67.

The oil pump 38 which draws-in oil from the tank 40, delivers into the conduit 66 connected to the working circuit 34 through the intermediary of three discharge valves 68, 69 and 70, placed in succession, one after the other.

The valve 68 is calibrated to a fixed value, or so-called high pressure, by a spring 71. The valve 69 is calibrated to a variable value by a spring 72 having its compression variable by a controlled slide-valve 73. The valve 70 is calibrated to a fixed or so-called medium pressure value, less than the value of the valve 68, by a spring 74. The variations in the compression of the spring 72 by the control 73 are such that the calibration of the intermediate valve 69 varies between the high pressure calibration of the valve 68 (FIG. 4) and the medium-pressure calibration of the valve 70 (FIG. 2).

It is the valve 70 which defines the pressure in the conduit 66, which is maintained constant and equal to the medium pressure.

The conduit 67 is controlled by the slide-valve 73 and, depending on the position of this latter, can be put into communication either with a conduit 75 connected immediately downstream of the valve 68, that is to say at the high pressure (FIG. 4), or with a conduit 76 which comprises a discharge valve 77, the spring 78 of which is set at a low value, greater than zero, which is the so-called low-pressure value (FIG. 2).

In the position shown in FIG. 2, the valve 50 is withdrawn and is put in the position of full working of the converter C, since the first face 64 of the piston 60 is put under medium pressure by the conduit 66, while the second face 65 of the piston 60 is put under low pressure by the conduits 67 and 76.

In the position shown in FIG. 4, the valve 50 is moved forward and closes the circuit 34 of the converter C, since the first face 64 of the piston 60 is always put under medium pressure by the conduit 66, while the second face 65 of the piston 60 is then put under high pressure by the conduits 67 and 75.

The transition from the position of FIG. 2 to the position of FIG. 4 and vice versa is effected in a progressive manner, as shown in FIG. 3, in which the position is intermediate. This results in a smooth and shockless operation of the valve 50, and also in the possibility of modulating this operation by acting on the slide-valve 73.

As shown in FIG. 2, the receiving shaft 11 is coupled to the pinions 24 and 27 by a gear-changing device 80 having two speed ratios, in the example shown: a first speed and a second speed, separated by a neutral or dead center. It is possible to pass from one gear to the other, whether for forward running or when in reverse, by a gear selection means, such as a gear-changing lever 81.

The separate chambers 41 and 41' of the clutches 19 and 19' are connected by the conduits 43 and 43' to the distributor 44 which controls the gear changing, and the latter is coupled through the conduit 45 to the tank 40 and by a conduit 82 to the outlet of the pump 38, controlled by the high-pressure valve 68, so that the conduit 82 is under high pressure.

In the position shown in FIG. 2, the distributor 44 puts the conduit 43 of the clutch 19 into communication with the conduit 45 connected to the tank 40, and the conduit 43' of the clutch 19' with the high-pressure conduit 82. The separate chamber 41 of the clutch 19 is under zero pressure, the separate chamber 41' of the clutch 19' is under pressure. With regard to the common chamber 31, this is under the medium pressure since it communicates through the circuit 34 with the medium pressure conduit 66. The clutch 19 is thus engaged and the clutch 19' is disengaged, as shown in FIG. 2.

In the position opposite to that of FIG. 2, the distributor 44 reverses the connections of the chambers 41 and 41' to the conduits 45 and 82. The clutch 19' is engaged and the clutch 19 is disengaged. There is reversal of direction of running. Between these two positions is located the neutral, at which the distributor 44 puts the two conduits 43 and 43' into communication with the high-pressure conduit 82, which disengages both the clutches 19 and 19'.

By acting on the distributor 44 and on the selector 81 and causing the neutral points to operate, the user can put the truck into first gear forward or in second gear forward, or in first gear reverse or in second gear reverse, or in neutral.

Reference will now be made to FIG. 5, in which the arrangement is similar to that which has been described above with reference to FIGS. 2 to 4, but in which an additional automatic device frees the user from the necessity of putting the distributor 44 at the neutral point when he wishes to change gears.

In accordance with this arrangement, when the selector lever 81 is operated, it acts on a switch 83 of an excitation circuit 84 of an auxiliary electro-valve 85 which is associated with the distributor 44.

As can be seen from FIG. 5, as long as the lever 81 is left alone and while the electro-valve 85 is de-excited, this electro-valve 85 puts the distributor 44 into the conditions of working in which the distributor is shown in FIG. 2. On the other hand, when the lever 81 is actuated to change gears and when the electro-valve 85 is excited, the two conduits 43 and 43' are put into communication with the high-pressure conduit 82, which disengages the two clutches 19 and 19'.

What we claim is:

1. A hydromechanical transmission comprising a housing, means for rotating the housing, a pair of output shafts, a clutch plate secured to each output shaft for rotation therewith, both of the clutch plates being disposed in the housing, a pair of pistons disposed in the housing and movable toward and away from each other and toward and away form the walls of the housing, the pistons defining first and second chambers between themselves and the walls of the housing, the pistons defining a third chamber between themselves, one of said clutch plates being disposed in each of said first and second chambers, and means for selectively individually subjecting the interior of each of said first and second chambers to higher hydraulic pressure than said third chamber.

2. A transmission as claimed in claim 1, and means for selectively individually subjecting the interior of each of said first and second chambers to lower hydraulic pressures than said third chamber.

3. A transmission as claimed in claim 1, the last-named means comprising means for selectively subjecting the interior of one of said first and second chambers to higher hydraulic pressures than said third chamber, and for subjecting the interior of said third chamber to higher hydraulic pressure than the other of said first and second chambers.

4. A transmission as claimed in claim 1, said means for rotating the housing comprising a hydraulic turbine, and means for continuously supplying the discharge of the turbine to the interior of said third chamber.

5. A transmission as claimed in claim 1, and means continuously yieldably urging the pistons toward each other.

6. A transmission as claimed in claim 1, and means fixing the pistons for rotation with the housing, 7. A transmission as claimed in claim 1, and a third output shaft, and means drivingly interconnecting each of said pair of output shafts with said third output shaft for rotation of the members of said pair of shafts in opposite directions relative to each other.

8. A hydromechanical transmission comprising an impeller, a turbine hydraulically driven by the impeller, and modulating means for selectively varying the hydraulic drive of the impeller thereby to regulate the driving force applied by the turbine, the modulating means comprising an annular shutter that engages movably in the impeller to alter the hydraulic drive force imposed on the turbine by the impeller, and means for reciprocating the shutter relative to the impeller, said reciprocating means comprising a control piston secured to the shutter and having opposed working faces, one said working face of the piston being subject to the hydraulic working pressure of the impeller, and means for applying to the other working face of the piston a variable hydraulic pressure.

9. A transmission as claimed in claim 8, and means for varying said variable pressure between values above and below said working pressure.

10. A transmission as claimed in claim 9, the last-named means comprising a calibrated valve for adjustably fixing said variable pressure at values above zero.

11. A hydromechanical transmission comprising an impeller, a turbine hydraulically driven by the impeller, a pair of output shafts, clutch means for selectively driving either of said output shafts from the turbine, a third output shaft, means drivingly interconnecting each of said pair of output shafts with said third output shaft for rotation of the members of said pair of shafts in opposite directions relative to each other so that the direction of said third shaft is controlled by selection of which of said pair of output shafts is to be driven, modulating means for selectively varying the hydraulic drive of the impeller thereby to regulate the driving force applied by the turbine to the third output shaft in either direction of rotation of the third output shaft, the modulating means comprising an annular shutter that engages movably in the impeller to alter the hydraulic drive force imposed on the turbine by the impeller, means for reciprocating the shutter relative to the impeller, said reciprocating means comprising a control piston secured to the shutter and having opposed working faces, one said working face of the piston being subject to the hydraulic working pressure of the impeller, and means for applying to the other working face of the piston a variable hydraulic pressure.

12. A transmission as claimed in claim 11, and means for varying said variable pressure between values above and below said working pressure.

13. A transmission as claimed in claim 12, the last-named means comprising a calibrated discharge valve for adjustably fixing said variable pressure at values above zero.

References Cited by the Examiner
UNITED STATES PATENTS

| | | | |
|---|---|---|---|
| 2,104,608 | 1/1938 | Cox et al. | 192—3.2 X |
| 2,251,972 | 8/1941 | Banner. | |
| 2,326,655 | 8/1943 | Jandasek | 60—54 |
| 2,465,739 | 3/1949 | McGill | 60—54 |
| 2,536,737 | 1/1951 | Gerst | 74—730 |
| 2,580,072 | 12/1951 | Barnett | 60—54 |
| 2,585,149 | 2/1952 | McGill | 60—54 |
| 2,646,864 | 7/1953 | Miller et al. | 192—3.2 X |
| 2,737,824 | 3/1956 | Livermore | 192—3.2 X |
| 2,861,480 | 11/1958 | Curtis | 192—4 X |
| 2,904,146 | 9/1959 | Codlin | 192—4 |
| 3,017,974 | 1/1962 | Lasley | 192—4 |
| 3,044,595 | 7/1962 | Herr | 192—87 |

DAVID J. WILLIAMOWSKY, *Primary Examiner.*

DON A. WAITE, *Examiner.*

THOMAS C. PERRY, *Assistant Examiner.*